US005815568A

United States Patent [19]
Trump

[11] Patent Number: 5,815,568
[45] Date of Patent: Sep. 29, 1998

[54] DISABLING TONE DETECTOR FOR NETWORK ECHO CANCELLER

[75] Inventor: Tönu Trump, Stockholm, Sweden

[73] Assignee: Telefoanktiebolaget LM Ericsson, Stockholm, Sweden

[21] Appl. No.: 594,584

[22] Filed: Jan. 31, 1996

[51] Int. Cl.⁶ .................................................. H04J 15/00
[52] U.S. Cl. ........................ 379/386; 379/406; 379/410
[58] Field of Search ................................. 379/406, 407, 379/410, 411, 386, 372, 3, 90.01; 370/276, 286, 290, 287, 291; 375/222, 261

[56] References Cited

U.S. PATENT DOCUMENTS

| | | | |
|---|---|---|---|
| 3,069,501 | 12/1962 | Gilman et al. ........................... | 379/407 |
| 3,647,993 | 3/1972 | Foulkes et al. ......................... | 379/412 |
| 4,317,210 | 2/1982 | Dekker et al. .......................... | 375/319 |
| 4,352,962 | 10/1982 | LaMothe ................................ | 379/343 |
| 4,658,420 | 4/1987 | Fukushi et al. ......................... | 379/407 |
| 4,829,566 | 5/1989 | Lassaux et al. ......................... | 379/286 |
| 4,901,333 | 2/1990 | Hodgkiss ................................ | 375/345 |
| 4,979,211 | 12/1990 | Benvenuto et al. ..................... | 395/2.6 |
| 5,123,009 | 6/1992 | Winter .................................... | 370/287 |
| 5,420,921 | 5/1995 | Lähdemäki ............................. | 379/407 |

FOREIGN PATENT DOCUMENTS

WO94/18759  8/1994  WIPO .............................. H04B 3/23

OTHER PUBLICATIONS

D. Raveglia et al., "Recognition of a 2100 Hz Tone with Phase Reversal for Disabling an Echo Canceller," *Proceedings of the Fourth International Conference on Signal Processing Applications and Technology*, vol. 1, pp. 179–185, Oct. 1993.

"Echo Cancellers", General Characteristics of International Telephone Connections and International Telephone Circuits, *ITU–T, G.* 165, pp. 1–27.

J.L. Melsa et al., "A Simple Phase–Reversal Tone Disabler," ICASSP 86 Proceedings, vol. 4, pp. 2619–2622, April, 1986.

*Primary Examiner*—Ahmad F. Matar
*Attorney, Agent, or Firm*—Burns, Doane, Swecker & Mathis, L.L.P.

[57] ABSTRACT

A method and apparatus for determining when an echo canceller should be disabled in a telephoning system is disclosed. First, a first power estimate is determined from an input signal. In addition, the input signal is divided into in-phase and quadrature components. The in-phase and quadrature components are then subsampled and used to determine a second power estimate. The first and second power estimates are compared to determine whether a predetermined tone is present. When the predetermined tone is detected, the present invention determines whether a phase reversal in the predetermined tone is present by using the in-phase and quadrature components. When the phase reversal is detected, the echo cancellers are disabled.

14 Claims, 4 Drawing Sheets

Fig. 6
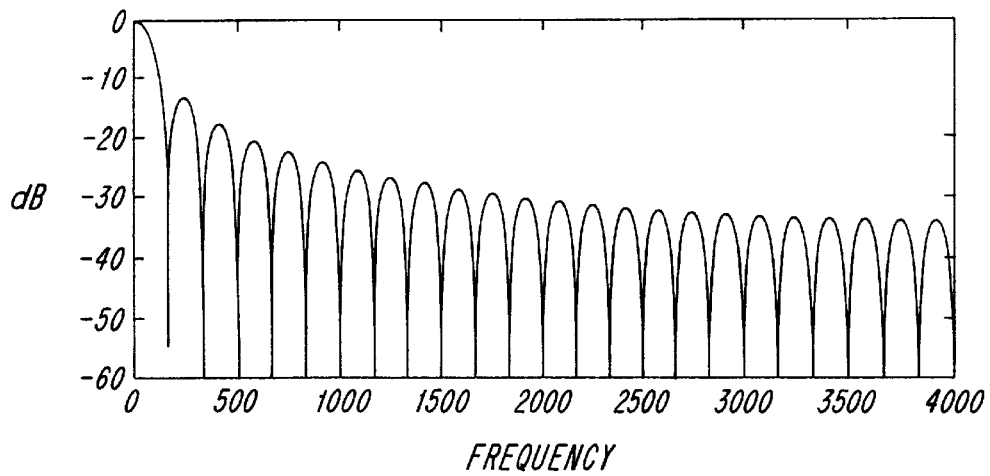
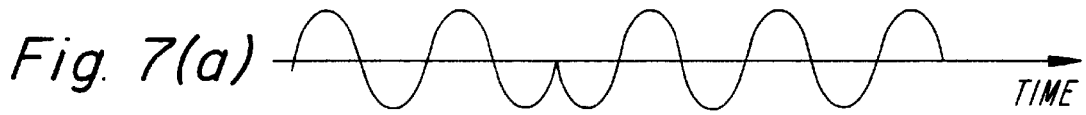
Fig. 7(a)
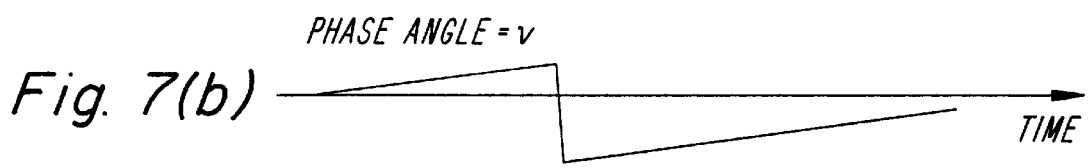
Fig. 7(b)
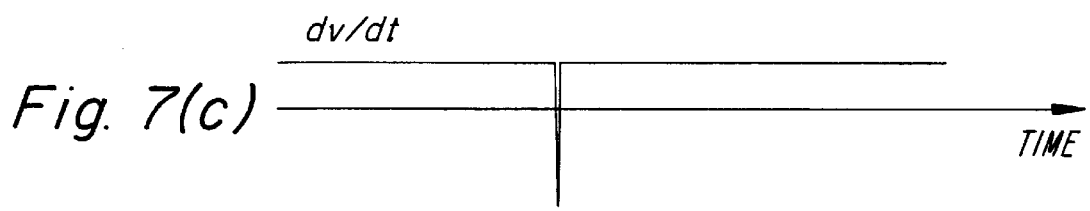
Fig. 7(c)
Fig. 7(d)

DISABLING TONE DETECTOR FOR NETWORK ECHO CANCELLER

The present invention relates primarily to network echo cancellers used in telephony systems, and more particularly to a disabling tone detector for determining when an echo canceller should be disabled.

BACKGROUND OF THE INVENTION

Echo is a phenomena which arises in telephony systems when part of the speech signal energy reflects back from the impedance mismatches in analog parts of the telephone network. The typical example is a 4 to 2 wire conversion in the public switch telephone network (PSTN) subscriber interface.

Every current land-based telephone is connected to a central office by a two-wire line which supports transmission in both directions. However, for calls longer than about 35 miles, the two directions of transmission must be segregated onto physically separate wires resulting in a four-wire line. The device that interfaces the two-wire and four-wire segments is called a hybrid. A typical long-distance telephone circuit can be described as being two-wire in the subscriber loop to the local hybrid, four-wire over the long haul network to the distant hybrid, and then two-wire to the distance telephone.

Although the use of hybrids facilitates long distance speech transmission, impedance mismatches at the hybrid may result in echoes. The speech of the speaker A is reflected off the distant hybrid (the hybrid closest to the speaker B) in the telephone network back toward the speaker A causing the speaker A to hear an annoying echo of his/her own voice. Network echo cancellers are thus used in the land-based telephone network to eliminate echoes caused by impedance mismatches at the hybrids and are typically located in the central office along with the hybrid. The echo canceller located closest to speaker A or B is thus used to cancel the echo caused by the hybrid at the other end of the call.

It is however, generally recommended that the echo canceller should be switched off for connections carrying high-bit rate data traffic with V-series modems, which have their own echo cancellers. In order to disable the echo network cancellers, the modems transmit a 2100 hertz tone, with periodic phase reversals inserted into the tone every 450 milliseconds, in the beginning of a data communication session. The echo canceller should be disabled if such a tone is transmitted and the echo canceller should not be disabled if a 2100 hertz tone without phase reversals is transmitted. The characteristics of the disable tone are defined in the ITU-T recommendation G 165, some of which are as follows. The tone detector must detect tones in the frequency range of 2079–2121 hertz with periodic phase changes in the range of 155–2050. The tone detector should not detect the tones outside the frequency range of 1900–2350 hertz. In addition, the tone disabler should not detect phase changes in the tone which are less than 110°. The white noise energy needed to inhibit the detection should not be greater than the energy of the tone. The tone detector should not detect tones with levels of less than −35 db.

Detection of a pure sine wave in noise is a classical signal processing problem with many known solutions. On the other hand, there is not that much known work on detection of sinewaves with periodical phase reversals. The optimal solution for the problem would be to implement a matched filter for the disabling signal. This would however lead to an algorithm with unacceptably high computational complexity and long processing delay.

The known tone detectors, used in practice, include some form of a phase locked loop operating on input signals. The output of phase locked loop is then compared to possibly time-shifted input signals. If no phase reversal is present, the output of the phase locked loop is close to the input signal. If a phase reversal occurs, the output of the phase locked loop will diverge from the input signal for a time determined by time constants involved in the phase locked loop. This difference is then used to detect the phase reversal. A problem with this solution is that the phase reversal detection is performed on signals which include out of band noise signals which lowers the probability of a correct detection. If band pass filtering were included in the scheme, it would remove, in addition to the out of band noise, the sharpness of the phase reversal and the phase locked loop would be able to track the resulting smooth phase change. This would result in less difference between the input and output signals and hence worsen the detection.

Thus, there is a need in the art for a tone detector which overcomes the deficiencies of the prior art cited above.

SUMMARY OF THE INVENTION

It is an object of the present invention to provide a tone disabler wherein the deficiencies of the cited prior art are overcome by using a feed forward receiver structure with in-phase and quadrature channels rather than a phase locked loop and phase reversal detection.

According to one embodiment of the present invention, a method and apparatus for determining when an echo canceller should be disabled in a telephoning system is disclosed. First, a first power estimate is determined from an input signal. In addition, the input signal is divided into in-phase and quadrature components. The in-phase and quadrature components are then sub-sampled and used to determine a second power estimate. The first and second power estimates are compared to determine whether a predetermined tone is present. When the predetermined tone is detected, the present invention determines whether a phase reversal in the predetermined tone is present by using the in-phase and quadrature components. When the phase reversal is detected, the echo cancellers are disabled.

BRIEF DESCRIPTION OF THE DRAWINGS

These and other features and advantages of the invention will be readily apparent to one of ordinary skill in the art from the following written description, used in conjunction with the drawings, in which:

FIG. 6 illustrates the amplitude characteristic of the low pass filter; and

FIGS. 7(a)–(d) illustrate input signals with phase change.

DETAILED DESCRIPTION

Unlike the prior art, the present invention does not use a phase locked loop in phase reversal detection. Instead, a feed forward receiver structure with in-phase and quadrature phase channels is used for tone detection. The same low pass filtered and sub-sampled in-phase and quadrature components are then used to compute a phase estimate of the received tone.

Figure 1:
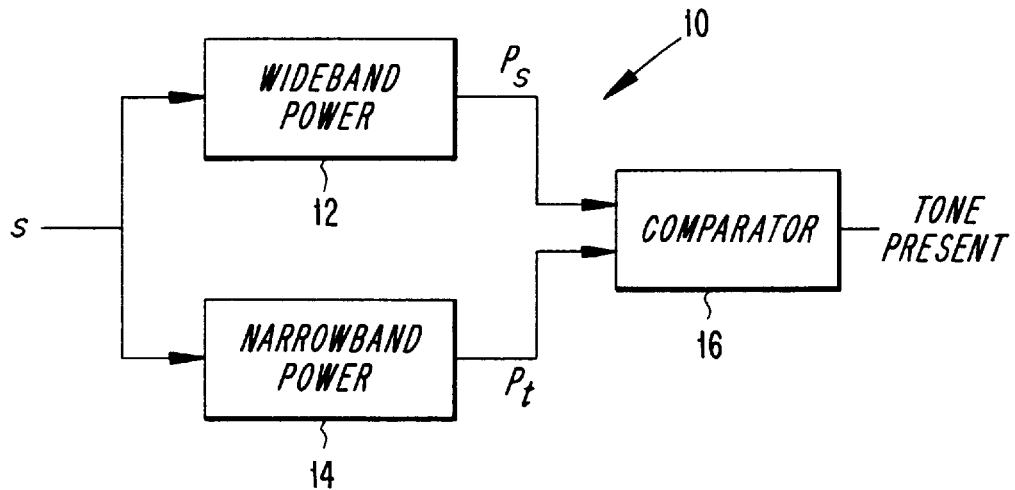
FIG. 1 illustrates a tone present detector according to one embodiment of the present invention.

The tone detector can be divided into three main sections: a section for detecting whether a tone is present; a second section for detecting silence; and a third section for detecting phase reversals. The section for detecting a tone is illustrated in FIG. 1. The detector 10 detects the specified tone while not reacting on speech signals which contain power at 2100 Hz. The input signal S is sent through two paths. The first path is subjected to a wideband power calculation in calculator 12 and lowpass filtered which results in a wideband power $P_s$ and the second path is subjected to a narrowband power calculation in calculator 14 and a lowpass filtered which results in a narrowband power $P_t$. The narrowband power $P_t$ is compared in a comparator 16 with the wideband power $P_s$. When it is determined that $P_t > P_s$, the 2100 Hz tone is considered to be present.

Figure 2:
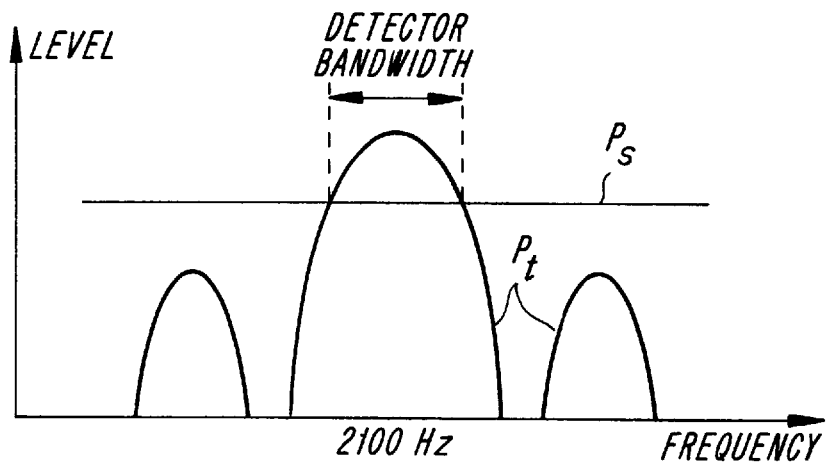
FIG. 2 illustrates frequency discrimination of the tone present detector.

If the input signal is a pure tone which is swept in frequency, then the levels of $P_t$ and $P_s$ will vary with frequency as is illustrated in FIG. 2. The detector bandwidth is defined by the narrowband filter and by the relative gain of the two paths. If the signal level is increased, both the $P_t$ and $P_s$ curves will move upwards in FIG. 2 but the detector bandwidth will stay the same. For low levels, the $P_s$ value is saturated at a threshold corresponding to $P_t = -33$ dBmO.

If the signal contains tone +noise, then the narrowband $P_t$ curve will only be slightly affected but the $P_s$ curve will move upwards significantly. At a certain noise level, the detector will cease to detect the tone. This effect will protect from false detections caused by speech or data signals which may contain 2100 Hz, but also contain significant power at other frequencies.

For the silence detector, the wideband power $P_s$ is used to detect the energy in the holding band. When the wideband power $P_s$ falls below a threshold, for example, $-34$ dBmO, the tone detector is released.

Figure 3:
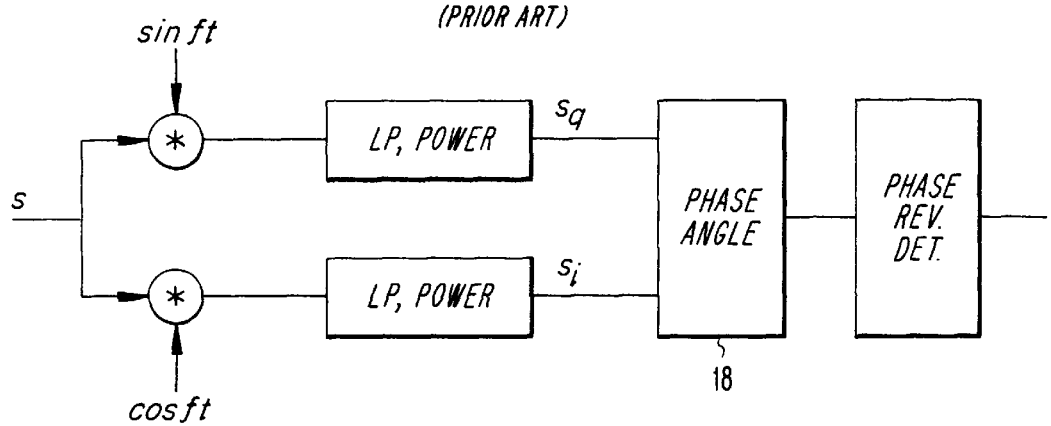
FIG. 3 illustrates a phase reversal detector according to one embodiment of the present invention.

The operation of the phase reversal detector is illustrated in FIG. 3. Since the input signal frequency may deviate from the nominal frequency of 2100 Hz, the phase angle will vary linearly with time. In order to get an easily detected signal, the second derivative of the phase angle is used, as will be further described below. The input signal is quadrature demodulated with a 2100 Hz reference signal to produce a sine and cosine component of the input signal and the phase angle is calculated in phase angle calculator 18.

Figure 4:
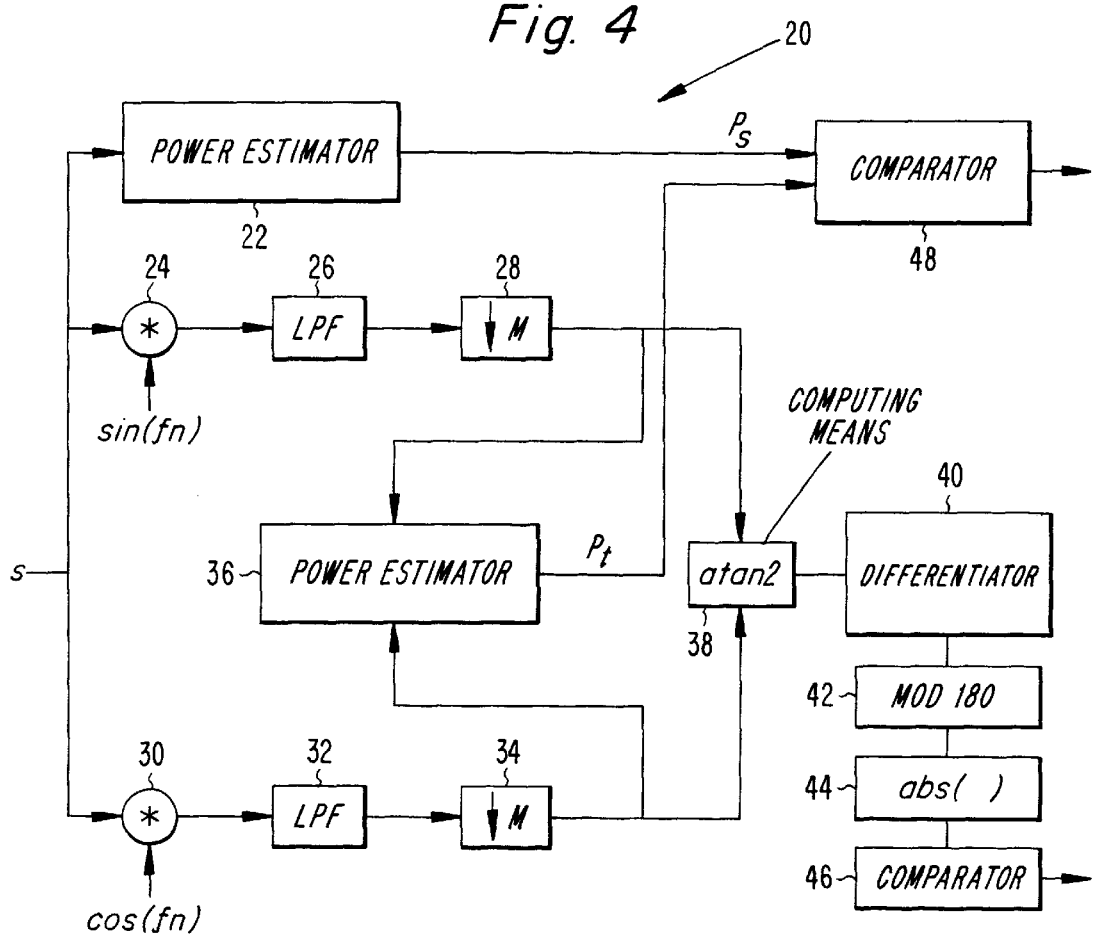
FIG. 4 illustrates a block diagram of the structure of a tone detector according to one embodiment of the present invention.
Figure 5:
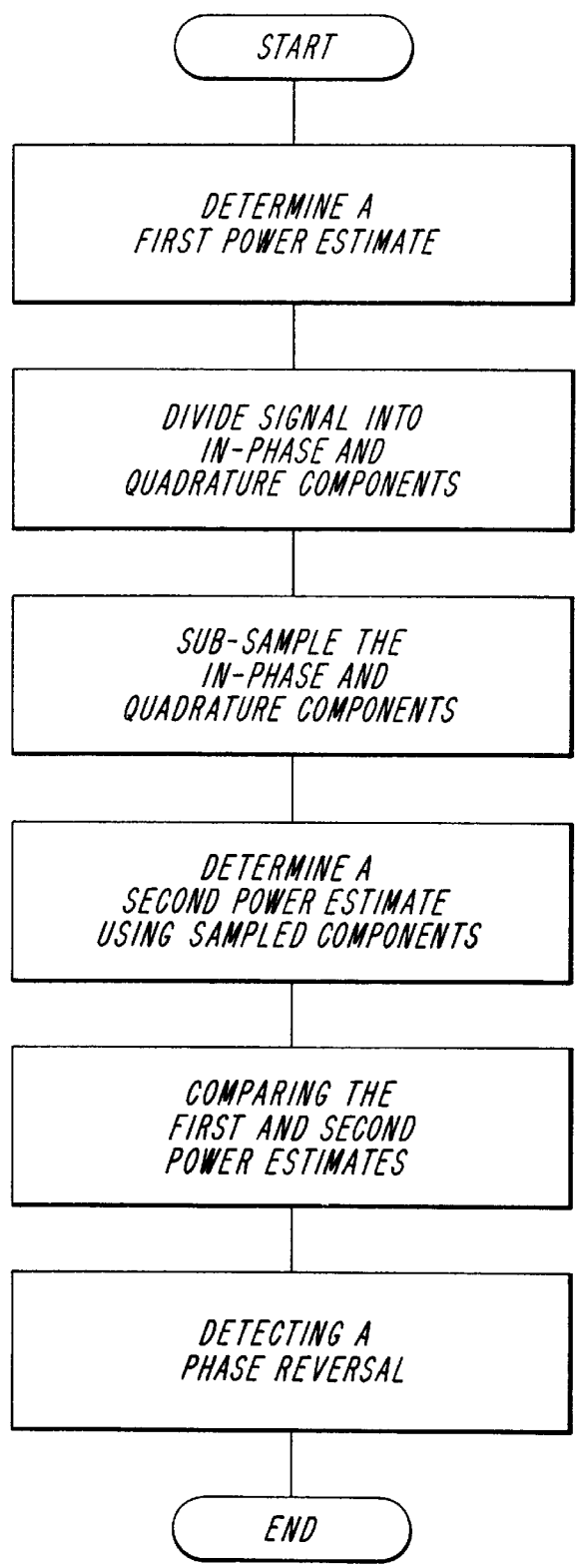
FIG. 5 illustrates a flow chart describing the operation of the tone detector according to one embodiment of the present invention.

A tone detector according to one embodiment of the present invention is illustrated in FIG. 4 and the operation of the tone detector will now be described with reference to FIGS. 4 and 5. The input signals is split into several branches when it enters the detector. In one branch, the input signal is applied to a power estimator 22 which computes a power estimate of the incoming signal s using a recursive formula $$P_s(n+1)=(1-\alpha)P_s(n)+\alpha s^2(n+1),$$

were $0<\alpha<1$.

In the main part of the detector 20, the input signal is multiplied by a sinewave $\sin(2\pi 2100t)$ and a cosinewave $\cos(2\pi 2100t)$ by multipliers 24, 30, respectively. The products outputted by the multipliers 24 and 30, are then low pass filtered in low pass filters 26 and 32. Finally, the low pass filtered signals are sub-sampled with a factor of m in sub-samplers 28 and 34. Sub-sampling of the in-phase and quadrature components is introduced with the aim to obtain a computationally efficient algorithm. A suitable value for m is 16, but other values satisfy the Nyquist sampling theorem after low pass filtering and are thus also possible.

The low pass filtering can be easily implemented via summation over forty-eight sequential samples. The impulse response of such a filter is given by:

$$h(t) = \left\{ \begin{array}{ll} 1, 0 \leq t \leq 47 \\ 0 \quad \text{otherwise} \end{array} \right\}$$

The frequency response of the filter can be found by calculating the Fourier transform of the impulse response.

$$H(e^{j\omega}) = \sum_{t=-\infty}^{\infty} h(t)e^{-j\omega t} = \frac{\sin 24\omega}{\sin \omega/2} e^{-(j47\omega)/2}$$

Thus, the filter has a linear phase characteristic and a lowpass amplitude characteristic which is illustrated in FIG. 6. As illustrated in FIG. 6, the zeros of the amplitude characteristic are placed at multiples of $f_s/48$ Hz, where $f_s$ is the sample frequency. This corresponds to rectangular window FIR filter design, which gives a narrow main lobe with relatively high side lobe levels. Note however that the side lobe level is not a primary concern in the present invention. Since just every sixteenth output sample of the low pass filtered output signal is required, the summation can naturally be performed using three sub-sums each covering 16 sequential samples. The reference tone can be easily generated using $$\cos f(n+1) = \cos f n \cos f - \sin f n \sin f$$

$$\sin f(n+1) = \sin f n \cos f + \cos f n \sin f$$

The power estimator 36 then estimates the power inside a small frequency band around 2100 Hz using $$P(n+1)=(1-\beta)P_t(n)+\beta(s_q^2(n+1)+s_i^2(n+1))$$

where $S_i$ and $S_q$ are the sub-sampled in-phase and quadrature components, respectively and $0 > \beta > 1$. The estimated tone power $P_t$ has to be compared to the estimated input signal power $P_s$ in a comparator 48, to determine whether a tone is present or not. The 2100 Hz tone is decided to be present if the following two conditions are simultaneously met for a predetermined period of time, for example, 260 ms:

1). Tone power, $P_t$ is larger than $-33$ dBmO; and

2). $P_t > 0.5 P_s$.

The first condition is used to determine whether the tone has high enough power to be significant according to the ITU-T G.165 specification. The second condition makes sure that the tone has a large enough power compared to the total signal power to be detected as a pure tone.

If it is determined that a tone is present, the detector must now determine whether a 180° phase reversal has also occurred. For this purpose, the detector computes the phase angle of the down sampled signal. In a fixed point implementation, the arctangent can be easily computed in computing means 58 using a Pade approximation given by $$a\tan x = \frac{x}{1 + 0.28x^2}, -1 < x < 1$$

The phase angle is consequently obtained by $$a\tan\frac{a}{b} = \frac{ab}{b^2 + 0.28a^2}, |a| < |b|$$

$$a\tan\frac{a}{b} = \frac{\pi}{2} \quad \frac{ab}{a^2 + 0.28b^2}, |a| > |b|$$

where a and b are the current quadrature and in-phase component respectively. The result obtained by the above formulas can be further shifted into the interval −180°, 180° by adding or subtracting 180° in accordance with the signs of a and b.

For a pure tone, the phase estimate is a linear function of time given by $$\phi(t) = 2\pi(\ -2100)t$$

where is the frequency of the input tone. If a phase reversal is present, the phase function includes discontinuity which can be detected by differentiating the phase estimate and comparing the result with a threshold. The discontinuity appears as an impulse in the derivative. The first derivative of the phase, however, includes an unknown constant component $2\pi(\ -2100)$ which should be taken into account in the threshold value. This component is not present in derivatives of order 2 and higher and thus the second derivative has been chosen for detection purposes but is not limited thereto. The second order derivative includes two consecutive impulses with opposite polarities when the phase reversal occurs and is close to 0 otherwise. If one approximates the differentiation by the corresponding difference, the height of the impulses relates directly to the phase change present. The second order difference can be computed as $$d(t) = \phi(t) - 2\phi(t-\tau) + \phi(t-2\tau)$$

where τ is the integer base value of the difference operator.

To detect the phase reversal, the detector thus computes a second order difference of the phase and converts the result into the interval (−180,180) degrees of means 42 and compares the absolute value obtained in absolute value means 42 of the result with a threshold in comparator 46. In one embodiment, the threshold value is set to 132.5°, i.e., the mean value of 110° and 155°. The phase reversal is decided to be present if the output has two consecutive peaks, separated in time by the base value of the difference operator.

If the phase of the tone changes by 180 degrees, as illustrated in FIGS. 7(a)(b), the first difference, φ(t)−φ(t−τ), consists of a constant determined by the frequency of the tone and a peak with a height of 180 degrees. The second difference consists of two 180 degree peaks. The constant component is removed. The second order difference is then compared to a threshold. To simplify the comparison the second derivative is first converted into the interval of main values of arc functions, i.e., into (−180, 180) degrees, by adding or subtracting 360 degrees if required. A further simplification is gained by taking the absolute value of the second derivative. Thus, only one positive threshold is required. Note, however, that this is just a simplification of the implementation. If the value of the second derivative exceeds the threshold at two time instants, separated by τ, then the phase reversal is decided to be present.

Low pass filtering effects the signal in such a way that the phase jump in the output of the demodulator is smoothed over several consecutive samples even in subsampled signals. To decrease the negative effect of the spread, the second order difference has to be compared with a large enough base τ. According to one embodiment of the present invention, a base value equal to eight samples can be used.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the medium range of equivalence thereof are intended to be embraced therein.

What is claimed:

1. A tone detector for controlling the operation of echo cancellers in a telephoning system, comprising:
    means for determining a first power estimate of an input signal;
    means for dividing said in-phase signal into phase and quadrature components;
    means for subsampling said in-phase and quadrature components;
    means for determining a second power estimate using said subsampled in-phase and quadrature components;
    means for comparing said first and second power estimates to determine whether a predetermined tone is present;
    means for detecting a phase reversal in said predetermined tone using said in-phase and quadrature components.

2. A tone detector according to claim 1, wherein a phase inversion of about 155 to 205 degrees occurs in the disable tone signal at intervals of about 420 to 480 ms.

3. A tone detector according to claim 1, wherein said predetermined tone is approximately 2100 Hz.

4. A tone detector according to claim 1, wherein said predetermined tone is in a range of 2079 to 2121 Hz.

5. A tone detector according to claim 1, wherein said means for detecting a phase reversal comprises:
    means for determining a higher order derivative of a phase estimate;
    means for converting said higher order derivative into a first value in an interval between −180, 180 degrees;
    means for comparing an absolute value of said first value with a threshold value to determine the presence of the phase reversal.

6. A tone detector according to claim 5, wherein said higher order derivative is a second order derivative.

7. A tone detector according to claim 5, wherein said threshold value is 132.5 degrees.

8. A method for the detection of a disabling tone in an echo canceller in a telephoning system, comprising the steps of:
    determining a first power estimate of an input signal;
    dividing said input signal into in-phase and quadrature components;
    sub-sampling said in-phase and quadrature components;
    determining a second power estimate using said sub-sampled in-phase and quadrature components;
    comparing said first and second power estimates to determine whether a predetermined tone is present;
    detecting a phase reversal in said predetermined tone using said in-phase and quadrature components.

9. A method according to claim 8, wherein a phase inversion of about 155 to 205 degrees occurs in the disable tone signal at intervals of about 420 to 480 ms.

10. A method according to claim 8, wherein said predetermined tone is approximately 2100 Hz.

11. A method according to claim 8, wherein said predetermined tone is in a range of 2079 to 2121 Hz.

12. A method according to claim 8, wherein said step of detecting a phase reversal comprises the steps of:

determining a higher order derivative of a phase estimate;

converting said higher order derivative into a first value in an interval between −180, 180 degrees;

comparing an absolute value of said first value with a threshold value to determine the presence of the phase reversal.

13. A method according to claim 12, wherein said higher order derivative is a second order derivative.

14. A method according to claim 12, wherein said threshold value is 132.5 degrees.

* * * * *